(12) United States Patent
Walker

(10) Patent No.: US 10,534,415 B2
(45) Date of Patent: *Jan. 14, 2020

(54) CONTROLLER AND A METHOD FOR POWER SEQUENCING A COMPUTER

(71) Applicant: Raytheon Company, Waltham, MA (US)

(72) Inventor: Debbie A. Walker, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/662,032

(22) Filed: Jul. 27, 2017

(65) Prior Publication Data

US 2018/0032116 A1    Feb. 1, 2018

Related U.S. Application Data

(63) Continuation of application No. 13/212,681, filed on Aug. 18, 2011, now Pat. No. 9,720,468.

(60) Provisional application No. 61/377,788, filed on Aug. 27, 2010.

(51) Int. Cl.
*G06F 1/26* (2006.01)
*G06F 1/24* (2006.01)
*G06F 1/08* (2006.01)

(52) U.S. Cl.
CPC .......... *G06F 1/26* (2013.01); *G06F 1/24* (2013.01); *G06F 1/08* (2013.01)

(58) Field of Classification Search
CPC ........ G11C 7/222; G11C 5/063; H03K 5/135; G06F 1/10; G06F 1/08
See application file for complete search history.

(56) References Cited

U.S. PATENT DOCUMENTS

| 5,877,641 A * | 3/1999 | Ziegler ............... G06F 1/08 327/156 |
| 6,639,957 B2 | 10/2003 | Cahill-obrien et al. |
| 7,055,064 B2 | 5/2006 | Lin |
| 9,720,468 B2 | 8/2017 | Walker |
| 2002/0004915 A1 | 1/2002 | Fung |
| 2003/0020524 A1 | 1/2003 | Ehmann |
| 2006/0208779 A1 | 9/2006 | Lin et al. |
| 2008/0082854 A1 * | 4/2008 | Ho ................. G06F 1/08 713/500 |
| 2011/0035575 A1 | 2/2011 | Kwon |

(Continued)

FOREIGN PATENT DOCUMENTS

WO    WO-2012027201 A1    3/2012

OTHER PUBLICATIONS

"U.S. Appl. No. 13/212,681, Final Office Action dated Mar. 4, 2015", 10 pgs.

(Continued)

*Primary Examiner* — Phil K Nguyen
(74) *Attorney, Agent, or Firm* — Schwegman Lundberg & Woessner, P.A.

(57) ABSTRACT

A controller and a method for power sequencing a computer. The controller may be configured to provide to a south bridge, before the south bridge has completed power management resets, a real time clock signal at a first frequency, and provide to the south bridge, after the south bridge has completed power management resets, a real time clock signal at a second frequency.

14 Claims, 5 Drawing Sheets

(56) References Cited

U.S. PATENT DOCUMENTS

2011/0055538 A1 3/2011 Cho et al.
2012/0054525 A1 3/2012 Walker

OTHER PUBLICATIONS

"U.S. Appl. No. 13/212,681, Non Final Office Action dated Jul. 16, 2014", 9 pgs.
"U.S. Appl. No. 13/212,681, Non Final Office Action dated Aug. 5, 2015", 10 pgs.
"U.S. Appl. No. 13/212,681, Non Final Office Action dated Sep. 22, 2016", 13 pgs.
"U.S. Appl. No. 13/212,681, Non-Final Office Action dated Mar. 14, 2016", 12 pgs.
"U.S. Appl. No. 13/212,681, Notice of Allowance dated Mar. 28, 2017", 11 pgs.
"U.S. Appl. No. 13/212,681, Response filed Jul. 6, 2015 to Final Office Aciton dated Mar. 4, 2015", 7 pgs.
"U.S. Appl. No. 13/212,681, Response filed Oct. 16, 2014 to Non Final Office Action dated Jul. 16, 2014", 9 pgs.
"U.S. Appl. No. 13/212,681, Response filed Dec. 22, 2016 to Non-Final Office Action dated Sep. 22, 2016", 9 pgs.
"U.S. Appl. No. 13/212,681, Response filed Jun. 14, 2016 to Non-Final Office Action dated Mar. 14, 2016", 9 pgs.
"U.S. Appl. No. 13/212,681, Response filed Nov. 5, 2015 to Non-Final Office Action dated Aug. 5, 2015", 9 pgs.
"International Application Serial No. PCT/US2011/048280, International Preliminary Report on Patentability dated Mar. 14, 2013", 5 pgs.
"International Application Serial No. PCT/US2011/048280, International Search Report dated Jan. 5, 2012", 2 pgs.
"International Application Serial No. PCT/US2011/048280, Written Opinion dated Jan. 5, 2012", 4 pgs.
U.S. Appl. No. 13/212,681 U.S. Pat. No. 9,720,468, filed Aug. 18, 2011, Controller and a Method for Power Sequencing a Computer.

\* cited by examiner

CONTROLLER AND A METHOD FOR POWER SEQUENCING A COMPUTER

CLAIM OF PRIORITY

This patent application is a continuation of and claims the benefit of priority under 35 U.S.C. § 120 to U.S. patent application Ser. No. 13/212,681, filed on Aug. 18, 2011, which claims the benefit of priority under 35 U.S.C. § 119 to U.S. Provisional Patent Application Ser. No. 61/377,788, filed on Aug. 27, 2010, both of which are hereby incorporated herein in their entirety.

BACKGROUND

Computers typically use embedded controllers to perform a manufacturer approved method for powering up the components of the computer, such as a processor, a north bridge, which typically handles communications between the processor and memory, and a south bridge, which typically handles the input/output ("I/O") for the computer. However, the power sequencing method approved by the manufacturer can be slow and lengthy, thereby causing the computer to boot-up slowly.

Furthermore, many computer systems require a battery back-up and a separate real-time clock ("RTC") so that when a BIOS for the computer is first booted, the BIOS can retrieve the current time and date. However, if the battery is discharged, the computer can take additional time to handle the errors associated with the un-updated data and time, thereby prolonging the boot process.

Accordingly, it is desirable to reduce or eliminate these issues. Other desirable features and characteristics of the present invention will become apparent from the subsequent detailed description of the invention and the appended claims, taken in conjunction with the accompanying drawings and this background of the invention.

BRIEF SUMMARY

In some embodiments a power sequencing method for a computer including a processor, a north bridge and a south bridge, is provided. The method may include providing to the south bridge, before the south bridge has completed power management resets, a real time clock signal at a first frequency, and providing to the south bridge, after the south bridge has completed power management resets, a real time clock signal at a second frequency wherein the first frequency is greater than the second frequency.

In other embodiments a computer including a processor a north bridge and a south bridge, is provided. The computer may include a system clock oscillating at a first frequency, a silicon oscillator oscillating at a second frequency, and a controller, connected to the processor, north bridge and south bridge. The controller may be configured to provide to the south bridge, before the south bridge has completed power management resets, a real time clock signal at the first frequency, and provide to the south bridge, after the south bridge has completed power management resets, a real time clock signal at the second frequency.

Still other embodiments provide a computer system. The computer system may include a processor, a north bridge communicatively connected to the processor, a south bridge communicatively connected to the north bridge, and a controller communicatively connected to the processor, the north bridge and the south bridge. The controller may be configured to provide to the south bridge, before the south bridge has completed power management resets, a real time clock signal at a first frequency, and to provide to the south bridge, after the south bridge has completed power management resets, a real time clock signal at a second frequency.

BRIEF DESCRIPTION OF THE DRAWINGS

The embodiments will hereinafter be described in conjunction with the following figures.

DETAILED DESCRIPTION

The following detailed description is merely exemplary in nature and is not intended to limit the embodiments or the application and uses of the embodiments. Furthermore, there is no intention to be bound by any theory presented in the preceding background or the following detailed description.

Figure 1:
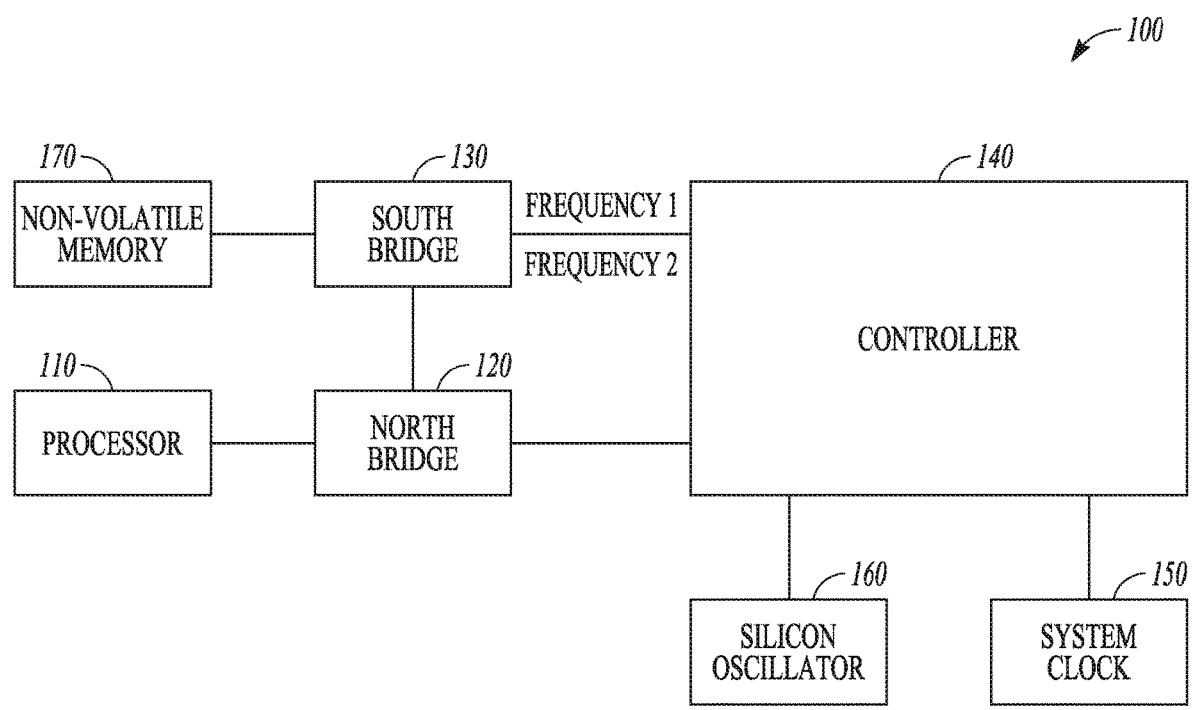
FIG. 1 illustrates an exemplary computer in accordance with an embodiment.

FIG. 1 illustrates an exemplary computer 100 in accordance with one embodiment. The computer 100 includes a processor 110, a north bridge 120, a south bridge 130 and a controller 140. The north bridge 120 and south bridge 130 are collectively known as a chipset. The computer 100 further includes a system clock 150, a silicon oscillator 160 and a non-volatile memory 170.

The processor 110 may be a computer processing unit ("CPU"), a graphical processing unit ("GPU"), a complex programmable logic device ("CPLD"), a micro-controller, an application specific integrated circuit ("ASIC"), a field programmable gate array ("FPGA") or any other processor or configurable logic device.

The north bridge 120, also known as a memory controller hub ("MCH") or an integrated memory controller ("IMC"), typically handles communications among the processor 110, volatile memory, such as random access memory ("RAM"), a PCI Express or advanced graphics port ("AGP") interface, and the south bridge 130. The south bridge 130, also known as an input/output ("I/O") controller hub, typically implements the I/O capabilities of the motherboard. Separating the chipset into the north bridge 120 and south bridge 130 is common, although there are instances where the two chips have been combined onto one die when design complexity and fabrication processes permit it. In another embodiment, the processor 110, north bridge 120 and south bridge 130 may be integrated onto a single die.

The controller 140 is a configurable or programmable logic device. In one embodiment the controller 140 may be a complex programmable logic device ("CPLD"). In other embodiments, the controller 140 may be a micro-controller, an application specific integrated circuit ("ASIC"), a field programmable gate array ("FPGA") or any other configurable logic device.

As discussed above, computer systems typically have a specified start-up power sequencing that is defined by the manufacturer. In other words, processor 110, north bridge 120 and south bridge 130 may each have multiple power input pins, each of which must be powered in the correct sequence according to the chipset manufacturer. For example, a computer system including a processor 110 and a corresponding Intel Core2 Duo chipset may have a total of 12 different power input pins and nine sequential steps in the power sequencing according to the PCI 2.3 and PCIe 1.1 specification. The recommended power sequencing generally maximizes the chance that the computer will successfully power-up. However, the recommended power sequence may not be the fastest or the most efficient for all purposes. For example, the PCI 2.3 and PCIe 1.1 specifications both call for a 100 millisecond wait time between the computer system receiving a valid, stable power signal and a reset deassertion, after which the computer system is allowed to continue with the power sequencing process. One benefit of various embodiments discussed herein is that the wait time can be significantly reduced, therefore reducing the overall boot time of the computer system 100. Furthermore, various embodiments discussed herein execute several of the power sequencing steps simultaneously, thereby further reducing the boot time of the computer 100, as described in further detail below.

As discussed above, a typical computer system, such as one using the Intel Core2 Duo® chipset, uses a battery backup to maintain sufficient power to a suspend well of a south bridge and further uses a crystal oscillator to provide an oscillating signal to the real time clock ("RTC") input of the south bridge so that the south bridge may maintain a current date and time which can be reported to the basic input/output system ("BIOS") during the boot-up process. Without a battery back-up and the crystal oscillator, typically computer systems generate errors after initial power-up since the system BIOS expects to have an updated time and date upon power-up. The RTC input for the south bridge of the Intel Core2 Duo® chipset must typically be stable when power is applied to the chip's suspend well. If the computer system does not have a battery back-up, and the battery dies, the RTC input to the south bridge will not be stable when power is applied to the chip's suspend well, typically resulting in an additional 2.5 seconds or more added to the boot time to handle the errors.

Accordingly, another benefit of certain embodiments discussed herein is that they do not require a battery backup and do not suffer from the added delay typical computer systems suffer. Computer systems which do not require battery backups are advantageous for many reasons. For example, in a missile system where the missile may be manufactured decades before the missile is put into use, a computer system which does not require a battery backup is advantageous since there is no battery that would need to be periodically maintained or replaced.

As discussed above, the computer 100 includes a system clock 150 and a silicon oscillator 160. One benefit of using a silicon oscillator 160 instead of a crystal oscillator is that the silicon oscillator is less likely to be affected by G-forces, which could occur, for example, if the computer was dropped, or if the computer was part of a projectile or other missile system. Furthermore, some silicon oscillators 160 may output stable oscillating frequencies in as little as 105.4 microseconds or so after receiving power.

The silicon oscillator 160 may, for example, output a signal oscillating at around 32.768 KHz. The frequency of the silicon oscillator 160, however, may vary depending upon the chipset used in the computer 100. As discussed in further detail herein, the south bridge 130 is designed to expect a specific frequency input to an RTC input on the south bridge 130 to accurately monitor the passage of time.

As discussed above, the controller 140 may be a CPLD. CPLD's may be powered up and configured in 450 microseconds or less. Accordingly, because the silicon oscillator 160 quickly outputs a stable oscillating frequency, and the controller 140 is operating within 450 microseconds, the controller can quickly apply an RTC input signal to the south bridge 130, thereby providing an RTC input for the south bridge 130 that is relatively stable when power is applied to the chip's suspend well and no battery backup is needed. Further, since the embodiment uses a silicon oscillator 160 and a CPLD, the power sequencing for the processor and chipset can be started in as little as 9 milliseconds. Previous systems, such as systems which used an H8 embedded controller to perform the power sequencing, take over two seconds before power sequencing the processor and chipsets even begins.

However, since the computer 100 does not use a battery back-up, the computer will not have a current date and time when the BIOS is booted. Accordingly, a custom BIOS is provided in non-volatile memory 170, which may be configured to ignore that a time and date have not been updated. Accordingly, another benefit of the embodiments described herein is that the computer 100 will not suffer from a delay caused by the BIOS not receiving an updated date and time.

As discussed above, the PCI 2.3 and PCIe 1.1 specifications call for a 100 millisecond wait time between a valid power signal and a reset deassertion. In other words, a reset signal is typically held high for 100 milliseconds to prevent the computer system from continuing with the power sequencing until certain conditions are guaranteed to be met. However, in certain instances, such as in some embedded applications, the full 100 milliseconds may not be needed. Further, some south bridges, such as the south bridge corresponding to the Intel Core2 Due chipset, use the signal input to an RTC input pin to determine when the 100 milliseconds have passed. Further, such south bridges 130 typically count the edges of the oscillating signal received at the RTC input pin to determine when the time has passed. The south bridge 130 therefore typically expects an input oscillating signal at a specific frequency at the RTC input pin. That is, the south bridge 130 counts to 100 milliseconds by counting a predetermined number of rising and/or falling edges, the predetermined number of edges being based upon an assumed input frequency.

Accordingly, the controller 140 receives the output signals from the silicon oscillator 160 and the system clock 150 and selectively sends one of the respective received oscillating signals to an RTC input of the south bridge 130. During the required wait time, as set forth in the PCI 2.3 and PCIe 1.1 specifications, the controller 140 sends a first oscillating signal, such as a signal based upon the system clock 150 as described in further detail below. The controller 140, after the wait period has ended, sends a second oscillating signal, such as a signal based upon the silicon oscillator 160, and completes the power sequencing as described in further detail below.

Figure 2:
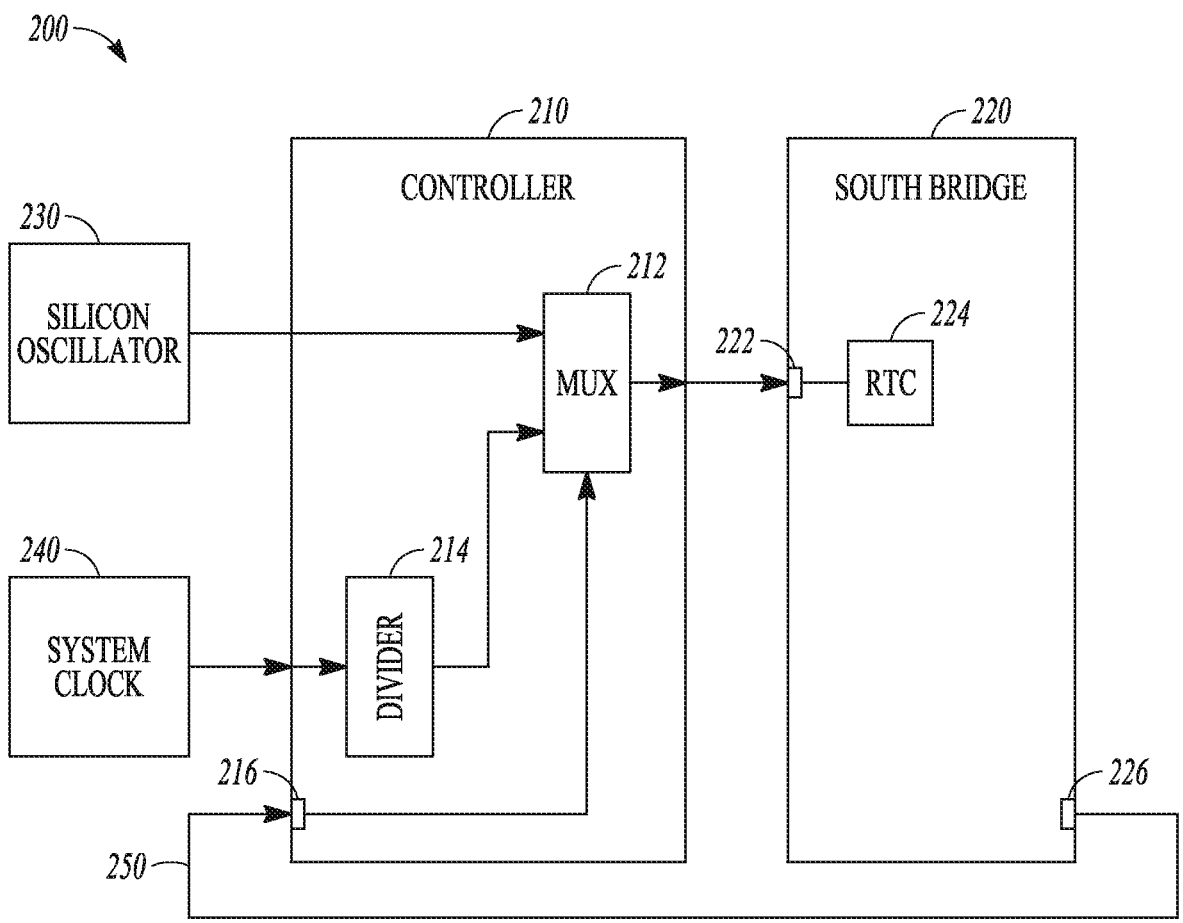
FIG. 2 illustrates another exemplary computer in accordance with an embodiment.

FIG. 2 illustrates another exemplary computer 200. The computer 200 includes a controller 210, a south bridge 220, a silicon oscillator 230, and a system clock 240. The controller 210 further includes a multiplexor ("MUX") 212 and may further include a divider 214.

As discussed above, the south bridge 220 includes an RTC 222 and an RTC input pin 224. The south bridge 220 controls the RTC based upon an input oscillating signal received at the RTC input pin. The south bridge 220 also has an output pin 226, which outputs a predetermined signal 250 after a predetermined point in the power sequencing of the south bridge. The output pin 226 is connected, via a circuit pathway or any other method, to an input pin 216 of the controller 210. The predetermined signal 250, for example, may be a switch from a lower voltage to a higher voltage and may indicate, for example, that the south bridge has completed power management resets.

The controller 210 receives respective oscillating signals from the silicon oscillator 230 and system clock 240 and directs the respective oscillating signals to the MUX 212. The MUX 212 is selectively controlled to output one of the respective oscillating signals based upon the signal output from the south bridge. The controller 210 is thus configured to output one of the oscillating signals from either the silicon oscillator 230 or the system clock 240 to the RTC input pin 224 of the south bridge 220.

In one embodiment the silicon oscillator 230 may output an oscillating frequency of 32.768 KHz and the system clock 240 may output an oscillating frequency of 100 KHz. In another embodiment, the system clock 240 may output an oscillating frequency of 100 MHz. The frequency of the silicon oscillator 230 and the system clock 240 may vary depending upon the processor and chipset used in the computer 200. In this embodiment, the controller may further include a divider 214. The divider 214 receives the oscillating signal from the system clock and output a divided signal. For example, if the system clock is outputting an oscillating frequency of 100 MHz, the divider may be configured to divide the signal by 1000, thereby outputting a 100 KHz signal.

As discussed above, the RTC of the south bridge 220 may be configured to expect a 32.768 KHz input signal as the basis for the RTC. In accordance with the embodiments discussed herein, the controller is configured to provide a higher frequency oscillating signal until a predetermined point in the power sequencing of the south bridge 220. For example, the controller may output the 100 KHz signal based upon the system clock 240. Since the RTC of the south bridge 220 assumes that the input is oscillating at 32.768 KHz, and the south bridge merely counts a predetermined number of edges of the RTC input signal during the wait period, by applying an input signal at a faster frequency, the south bridge will pass through the wait period at an accelerated rate. Accordingly, one benefit of some embodiments discussed herein is that the wait time required by the PCI 2.3 and PCIe 1.1 specifications can be reduced by 66% or more, thereby reducing the overall boot time of the computer system 200. The wait time may be adjusted depending upon what is actually required by the computer system 200.

Figure 3:
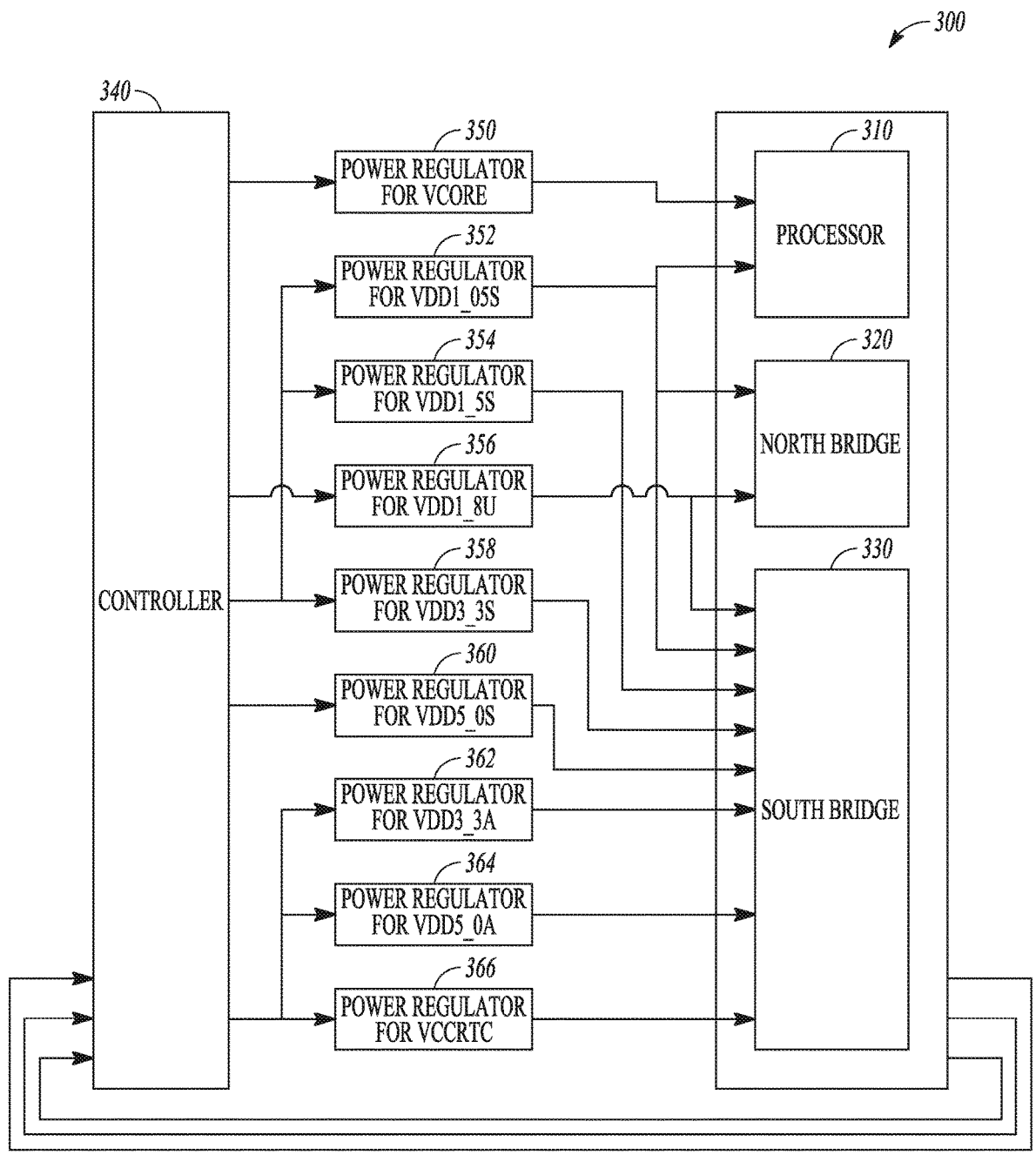
FIG. 3 illustrates yet another exemplary computer in accordance with an embodiment.

FIG. 3 illustrates yet another computer 300 in accordance with an embodiment. The computer includes a processor 310, a north bridge 320, a south bridge 330 and a controller 340. The computer further includes nine power regulators, regulators 350-366. Each of the power regulators 350-366 may receive a higher input voltage and regulate the input voltage to a lower level which may be needed by the processor 310, north bridge 320 or south bridge 330. As discussed above, the controller 340 controls the power sequencing for the processor 310, north bridge 320 and a south bridge 330. The operation of the embodiment illustrated in FIG. 3 will be discussed in conjunction with FIG. 4.

Figure 4:
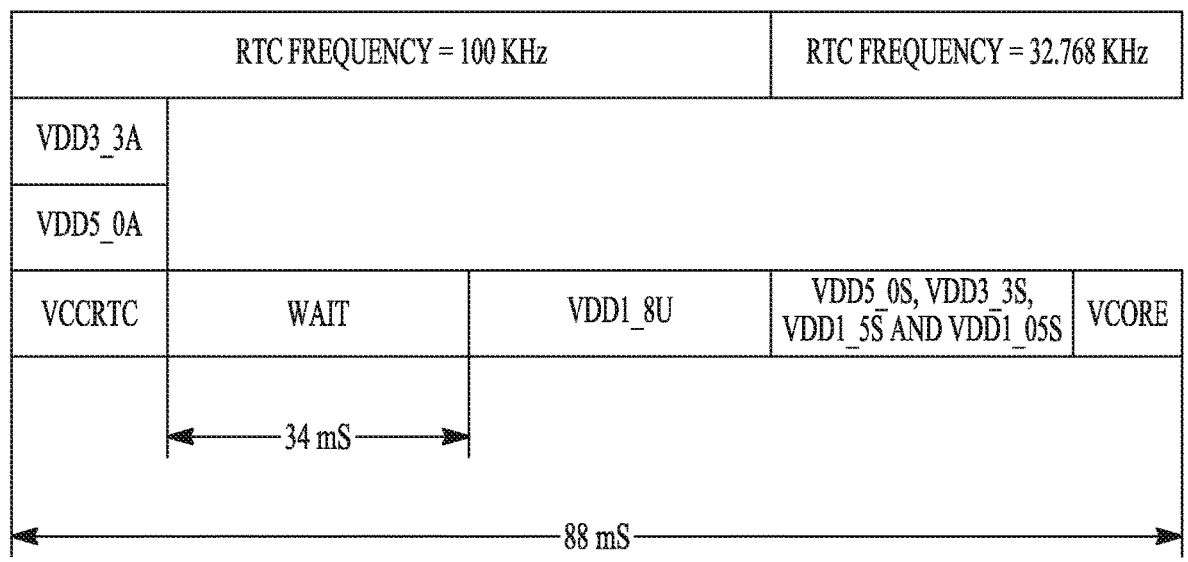
FIG. 4 illustrates an exemplary timing diagram for a power sequencing operation in a computer in accordance with an embodiment.

FIG. 4 illustrates an exemplary timing diagram for a power sequencing operation during boot up of the computer system 300. It should be noted that FIG. 4 is not drawn to scale.

The power sequencing by controller 340 begins by powering regulators 362, 364 and 368 for VDD3_3A, VDD5_0A and VCCRTC, respectively as seen in FIG. 4. Prior systems powered each of these regulators sequentially. However, regulators 362, 364 and 368 can be powered simultaneously in some implementations without suffering from any boot timeline penalties or any errors. The controller then proceeds to wait as prescribed by the PCI 2.3 and PCIe 1.1 specifications. However, as discussed above, the controller 340 issues a faster than expected oscillating signal to the RTC pin of the south bridge 330 during the wait period as seen in FIG. 4. Accordingly, in one embodiment, the wait period may last 34 milliseconds instead of the prescribed 100 milliseconds. In other embodiments, the wait period may be increased or decreased depending upon the needs of the computer system.

After the wait period, the controller applies power to regulator 356 for VDD1_8U. The controller 340 then simultaneously applies power to regulators 352, 354, 358 and 360 for VDD1_05S, VDD1_5S, VDD3_3S an VDD5_0S, respectively. Finally, as seen in FIG. 4, the controller applies power to regulator 350 for VCORE. As seen in FIG. 4, the power sequencing for processor 310, north bridge 320 and a south bridge 330 can be accomplished in 88 milliseconds or less. Furthermore, the power sequencing of the controller and the time required to start up and stabilize the system clock and silicon oscillator may add as little as 9 milliseconds to the power sequencing process. Accordingly, in one embodiment, the entire power sequencing for the computer 300 may be accomplished in 97 milliseconds. Accordingly, the power sequencing may be completed in significantly less time then in previous systems.

Figure 5:
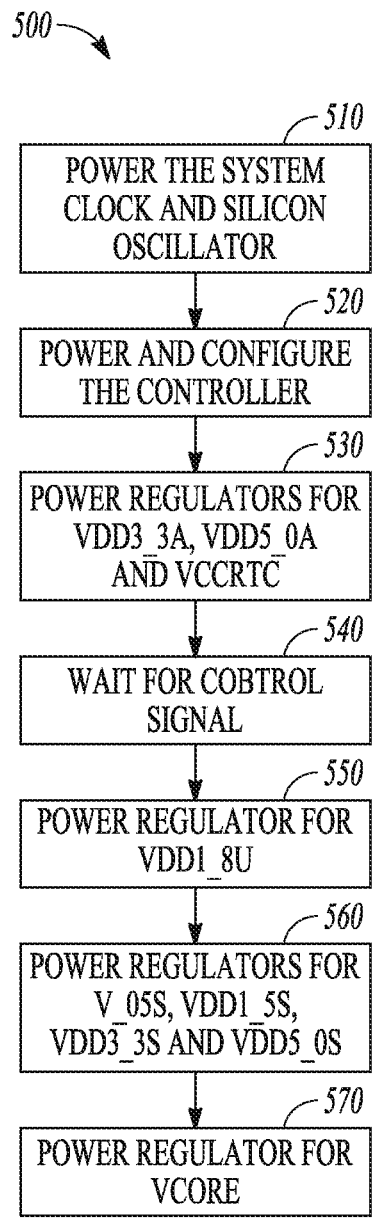
FIG. 5 illustrates an exemplary method for a power sequencing a computer in accordance with an embodiment.

FIG. 5 illustrates a method 500 for power sequencing a computer. The computer, after being powered on, first powers a system clock and a silicon oscillator. (Step 510). The computer then powers and configures a controller. (Step 520). The controller then simultaneously powers regulators for inputs VDD3_3A, VDD5_0A and VCCRTC. (Step 530). The controller then proceeds to wait as prescribed by the PCI 2.3 and PCIe 1.1 specifications. (Step 540).

After the wait period, the controller applies power to input VDD1_8U. (Step 550). The controller 340 then simultaneously applies power to inputs VDD1_05S, VDD1_5S, VDD3_3S and VDD5_0S. (Step 560). The controller then applies power to the VCORE. (Step 570).

Figure 6:
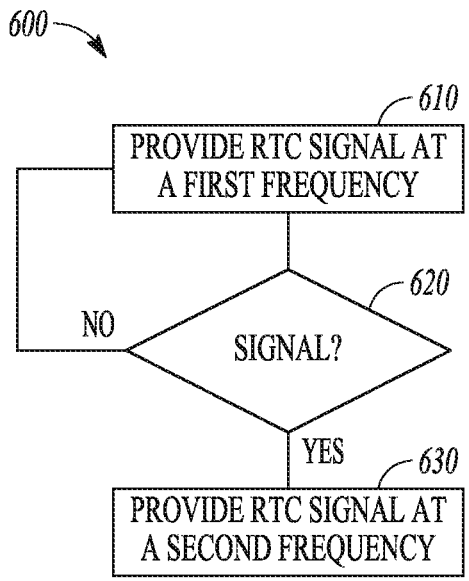
FIG. 6 illustrates another exemplary method for a power sequencing a computer in accordance with an embodiment.

FIG. 6 illustrates a power sequencing method 600 in accordance with an embodiment. A controller first provides an RTC signal oscillating at a first frequency to the south bridge as described above. (Step 610). The controller then waits for a control signal from the south bridge, as described herein. (Step 620). When the controller receives the control signal from the south bridge, the controller provides the south bridge an RTC signal oscillating at a second frequency as described above. (Step 630).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A method of power sequencing a computer including a south bridge by a controller, comprising:
providing to the south bridge, before the south bridge has completed power management resets, a real time clock signal at a first frequency,
wherein the real time clock signal at the first frequency is generated by a system clock oscillating at the first frequency; and
providing to the south bridge, after the south bridge has completed power management resets, a real time clock signal at a second frequency,
wherein the real time clock signal at the second frequency is generated by a silicon oscillator oscillating at the second frequency;
wherein the first frequency is greater than the second frequency; wherein the south bridge counts a number of edges in the real time clock signal at the first frequency such that the south bridge passes through a wait period at an accelerated rate.

2. The power sequencing method of claim 1, comprising:
receiving, by the controller, a signal from the south bridge and selecting one of the first and second frequencies for the real time clock signal based upon the signal received from the south bridge.

3. The power sequencing method of claim 1, wherein the first frequency is around 100 KHz and the second frequency is around 32.768 KHz.

4. The power sequencing method of claim 1, wherein the power sequencing is completed in 100 milliseconds or less.

5. The power sequencing method of claim 4, wherein the power sequencing for the processor, north bridge and a south bridge begins within 10 milliseconds of the computer receiving power.

6. A computer including a processor and a south bridge, comprising:
a system clock oscillating at a first frequency;
a silicon oscillator oscillating at a second frequency; and
a controller, connected to the processor and south bridge, wherein the controller is configured to:
provide to the south bridge, before the south bridge has completed power management resets, a real time clock signal at the first frequency, and provide to the south bridge, after the south bridge has completed power management resets, a real time clock signal at the second frequency;
wherein the first frequency is greater than the second frequency; and
wherein the south bridge counts a number of edges in the real time clock signal at the first frequency such that the south bridge passes through a wait period at an accelerated rate.

7. The computer of claim 6, wherein the first frequency is around 100 KHz and the second frequency is around 32.768 KHz.

8. The computer of claim 6, comprising:
a north bridge; and
a plurality of power regulators communicatively connected between the controller and at least one of the processor, the north bridge and the south bridge.

9. The computer of claim 8, wherein the controller is further configured to apply power to each of the power regulators according to a predetermined power sequencing, wherein at least two of the power regulators have power applied simultaneously.

10. The computer of claim 9, wherein the power sequencing is completed in less than or equal to 100 milliseconds.

11. The computer of claim 10, wherein the power sequencing for the processor, north bridge and a south bridge begins within 10 milliseconds of the computer receiving power.

12. A computer system, comprising:
a processor;
a south bridge communicatively connected to the processor; and
a controller communicatively connected to the processor and the south bridge, wherein the controller is configured to:
provide to the south bridge, before the south bridge has completed power management resets, a real time clock signal at a first frequency, and provide to the south bridge, after the south bridge has completed power management resets, a real time clock signal at a second frequency, wherein the first frequency is greater than the second frequency;
a system clock generating a signal at the first frequency;
a silicon oscillator generating a signal at the second frequency; and
a multiplexor receiving the signals generated by the system clock and silicon oscillator and further receiving a control signal from the south bridge, wherein the control signal determines which of the signal generated by the system clock and the signal generated by the silicon oscillator to provide as the real time clock signal;
wherein the control signal switches between the signal generated by the system clock and the signal generated by the silicon oscillator after the south bridge completes power management resets;
wherein the controller comprises a divider and the controller is configured to divide the signal received from the system clock; and
wherein the south bridge counts a number of edges in the real time clock signal at the first frequency such that the south bridge passes through a wait period at an accelerated rate.

13. The computer system of claim 12, wherein the first frequency is around 100 KHz and the second frequency is around 32.768 KHz.

14. The computer system of claim 12, wherein a power sequencing of the computer is completed in less than or equal to 100 milliseconds.

* * * * *

UNITED STATES PATENT AND TRADEMARK OFFICE
CERTIFICATE OF CORRECTION

PATENT NO. : 10,534,415 B2
APPLICATION NO. : 15/662032
DATED : January 14, 2020
INVENTOR(S) : Debbie A. Walker It is certified that error appears in the above-identified patent and that said Letters Patent is hereby corrected as shown below:

On the Title Page

On page 2, in Column 1, Item (56) under "Other Publications", Line 12, delete "Aciton" and insert --Action-- therefor In the Specification In Column 6, Line 2, delete "368" and insert --366-- therefor In Column 6, Line 5, delete "368" and insert --366-- therefor Signed and Sealed this
Eleventh Day of August, 2020

Andrei Iancu
*Director of the United States Patent and Trademark Office*